United States Patent
Kyogoku et al.

(10) Patent No.: US 9,569,075 B2
(45) Date of Patent: Feb. 14, 2017

(54) INFORMATION-PROCESSING DEVICE, INFORMATION-PROCESSING SYSTEM, STORAGE MEDIUM, AND INFORMATION-PROCESSING METHOD

(71) Applicant: NINTENDO CO., LTD., Kyoto (JP)

(72) Inventors: Aya Kyogoku, Kyoto (JP); Keiko Kochi, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 112 days.

(21) Appl. No.: 14/100,355

(22) Filed: Dec. 9, 2013

(65) Prior Publication Data

US 2015/0040034 A1 Feb. 5, 2015

(30) Foreign Application Priority Data

Aug. 1, 2013 (JP) ................................ 2013-160198

(51) Int. Cl.
   *G06F 3/00* (2006.01)
   *G06F 3/0484* (2013.01)
   *G06Q 50/00* (2012.01)

(52) U.S. Cl.
   CPC .......... *G06F 3/04842* (2013.01); *G06Q 50/01* (2013.01)

(58) Field of Classification Search
   CPC ................. G06F 3/04842; H04L 51/32; A63F 2300/5553; A63F 2300/572
   See application file for complete search history.

(56) References Cited

U.S. PATENT DOCUMENTS

| | | | |
|---|---|---|---|
| 6,396,509 B1* | 5/2002 | Cheng | G06F 3/011 345/419 |
| 7,594,179 B2* | 9/2009 | Takemura et al. | 715/757 |
| 2008/0215975 A1* | 9/2008 | Harrison et al. | 715/706 |
| 2008/0215994 A1* | 9/2008 | Harrison | A63F 13/10 715/757 |
| 2009/0109228 A1* | 4/2009 | Shuster | 345/474 |
| 2009/0199111 A1* | 8/2009 | Emori et al. | 715/758 |
| 2010/0036729 A1* | 2/2010 | Hamilton, II | G06Q 30/0251 705/14.49 |
| 2011/0202834 A1* | 8/2011 | Mandryk et al. | 715/701 |
| 2013/0151603 A1* | 6/2013 | Lobb et al. | 709/204 |

OTHER PUBLICATIONS

"Wii U Miiverse Intendo" [Online Document] http://www.nintendo.co.jp/wiiu/hardware/features/miiverse/index.html (4 pages) and it's English counterpart http://www.nintendo.com/wiiu/built-in-software/#/miiverse (5 pages), printed Dec. 2, 2013.

* cited by examiner

*Primary Examiner* — Omar Abdul-Ali
(74) *Attorney, Agent, or Firm* — Nixon & Vanderhye PC (57) ABSTRACT

An example information-processing device includes: a first display controller that displays one or more objects in a virtual space; a first accepting unit that accepts a instruction to select one of the one or more displayed objects displayed by the first display controller; a second accepting unit that accepts shared information; and a posting unit that posts the shared information accepted by the second accepting unit, associated with the object selected by the first accepting unit, to an information sharing service for sharing information among a plurality of users.

31 Claims, 5 Drawing Sheets

INFORMATION-PROCESSING DEVICE, INFORMATION-PROCESSING SYSTEM, STORAGE MEDIUM, AND INFORMATION-PROCESSING METHOD

CROSS REFERENCE TO RELATED APPLICATIONS

The disclosure of Japanese Patent Application No. 2013-160198, filed on Aug. 1, 2013, is incorporated herein by reference.

FIELD

The technique described herein relates to sharing information.

BACKGROUND AND SUMMARY

There is known in the art a technique of displaying users' avatars in a virtual space, and displaying posts (text or image) of the users near their avatars.

According to one aspect of the technique, there is provided an information-processing device, comprising: a first display controller that displays one or more objects in a virtual space; a first accepting unit that accepts an instruction to select one of the one or more objects displayed by the first display controller; a second accepting unit that accepts shared information; and a posting unit that posts the shared information accepted by the second accepting unit, associated with the object selected by the first accepting unit, to an information sharing service for sharing information among a plurality of users.

DETAILED DESCRIPTION OF NON-LIMITING EXEMPLARY EMBODIMENTS

1. Exemplary Embodiment

Figure 1:
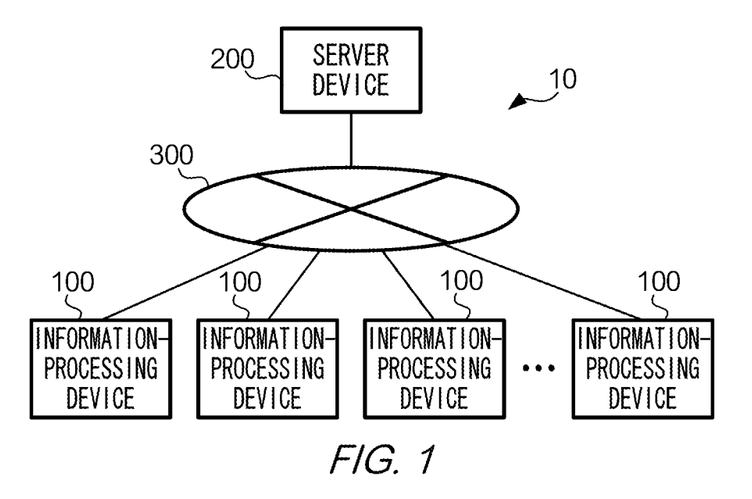
FIG. 1 is a block diagram showing an example of a non-limiting configuration of an information sharing system.

FIG. 1 is a block diagram showing a configuration of information sharing system 10, which is an exemplary embodiment according to the present technique. Information sharing system 10 is a computer system for using an information sharing service. In the present exemplary embodiment, an information sharing service is a service for sharing information among plural users, such as a social networking service (SNS). The plural users herein may be predetermined users (for example, registered users of the service), or unspecified users.

In the present exemplary embodiment, the information sharing service is a service for sharing information posted with regard to characters that appear in a certain game (video game). Users can post information about their favorite characters. Characters herein are not characters associated with specific users, such as characters represented by avatars. One of the characteristics of the present exemplary embodiment is that not only a specific user but also plural users can post information associated with a certain character. The number of characters is not limited. The number of characters may vary from one game to another, and number in the dozens or the hundreds.

Further, in the present exemplary embodiment, the information sharing service is a service for sharing information within a community, which community has been created with respect to a certain game. In other words, a community herein is a group of plural users sharing information with respect to a certain game. In the present exemplary embodiment, information sharing system 10 is described to handle only one community with respect to a specific game. However, information sharing system 10 may handle plural communities. In the game herein, a birthday of each character is set as its attribute. In addition, a condition with respect to timing is set for certain characters (or all characters). For example, the condition may be that a certain character is displayed for a specific period of time.

Hereinafter, the information posted to the information sharing service by users will be referred to as "shared information," and the user who posted shared information will be referred to as a "poster" when it is necessary to distinguish the user from other users. Shared information may be available to all users or only to specific users. An extent to which information can be set so that it is only possible to share information with users having a specific relationship to the poster, such as friends of the poster.

Information sharing system 10 includes plural information-processing devices 100 and server device 200, which are connected to one another via network 300 such as the Internet. Server device 200 is a computer device that carries out main processing for providing the information sharing service to users. Information-processing device 100 is a computer for posting shared information to the information sharing service, and corresponds to a client device of server device 200.

Figure 2:
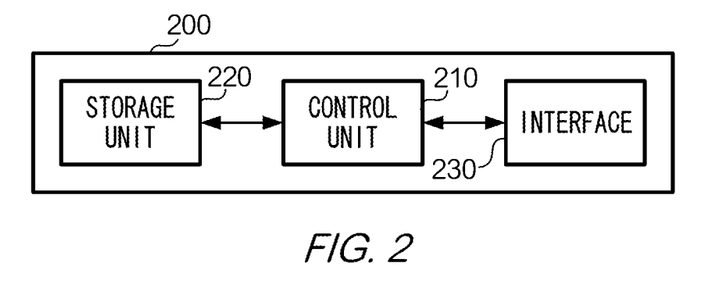
FIG. 2 is a block diagram showing an example of a non-limiting hardware configuration of a server device.

FIG. 2 is a block diagram showing a hardware configuration of server device 200. Server device 200 includes control unit 210, storage unit 220, and interface 230. Control unit 210 is a unit for controlling operations of components of server device 200. Specifically, control unit 210 includes a processor such as a CPU (Central Processing Unit) and a main memory, and executes programs to control operations of the components. Storage unit 220 is a unit for storing data. Specifically, storage unit 220 includes a storage medium such as a hard disk, and stores shared information and other data. Interface 230 is a unit for exchanging data with information-processing device 100.

It is to be noted that data using server device 200 may be stored in an external storage device, not in a memory included in server device 200 such as storage unit 220. In addition, functions of server device 200 can be realized by use of a single apparatus or by use of multiple apparatuses (servers) co-operating with each other.

Figure 3:
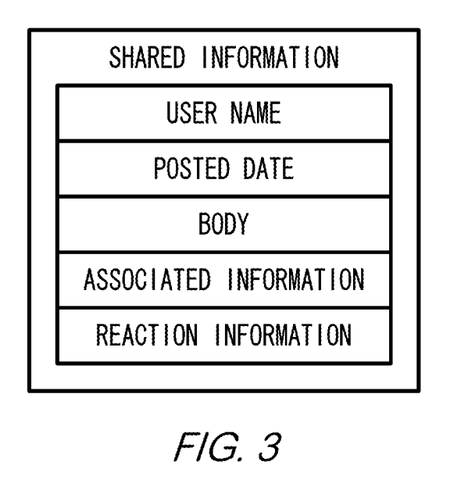
FIG. 3 shows an example of a non-limiting data structure of shared information.

FIG. 3 is a diagram showing an example data structure of shared information. In the present exemplary embodiment, shared information is data including user name, posted date, body, associated information, and reaction information. User name is data indicative of identifying the poster. User name may be the real name of the poster or his/her nickname in a community. Posted date is data indicative of the date the shared information was posted. Posted date does not have to be input by the poster. Posted date is added by server device 200 when the shared information is posted. Body is data indicative of text or an image input as a body of the shared information.

Associated information is data indicative of an association between the shared information and a character in a case that the character is associated with the shared information. Associated information is, for example, a name or an identification number assigned to each character. However, shared information may not include associated information if the shared information is not associated with any character. Alternatively, shared information may include associated information not associated with any character.

Reaction information is data indicative of a posted reaction of users to the shared information. The reaction herein indicates responses of users who read the shared information. Specifically, the reaction represents some sort of input (feedback) of the users. A reaction may be one of several types. For example, "sympathy," which represents a feeling of understanding or agreement with the content of the shared information, and "comment," which is a remark on the shared information, is a possible reaction. Reaction information indicates a number of users who posted such reactions.

Figure 4:
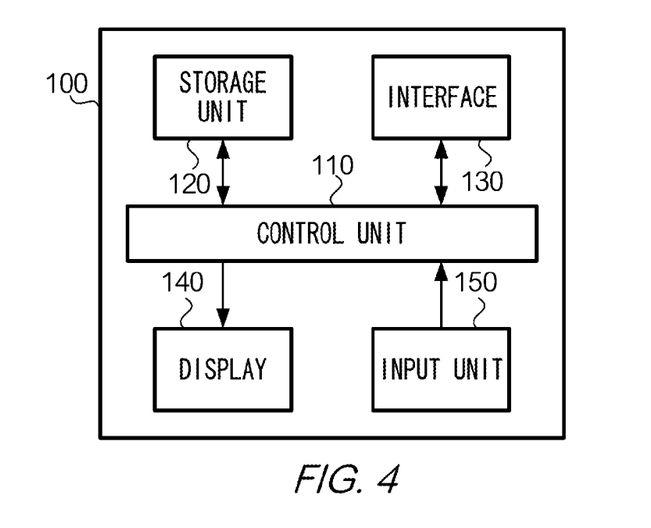
FIG. 4 is a block diagram showing an example of a non-limiting hardware configuration of an information-processing device.

FIG. 4 is a block diagram showing a hardware configuration of information-processing device 100. Information-processing device 100 includes control unit 110, storage unit 120, interface 130, display 140, and input unit 150.

Control unit 110 is a unit for controlling operations of components of information-processing device 100. Specifically, control unit 110 includes a processor such as a CPU and a main memory, and executes programs to control operations of the components. Control unit 110 also controls posting and display of shared information by executing a specific application program.

Storage unit 120 is a unit for storing data. Specifically, storage unit 120 includes a storage medium such as a flash memory, and stores the programs and data necessary for posting shared information. Storage unit 120 may include a data reader/writer to a detachable storage medium (removable medium) such as a memory card.

Interface 130 is a unit for exchanging data with server device 200 connected via network 300. Interface 130 may also be configured to communicate with external devices other than server device 200. Interface 130 may communicate with the external devices by wired or wireless communication.

Display 140 is a unit for displaying information. Specifically, display 140 includes a display panel that is composed of display elements such as liquid crystal elements and a drive circuit, and displays information (characters and images) in accordance with data provided by control unit 110. It is to be noted that information-processing device 100 may be configured without display 140. Information-processing device 100 may be configured to connect with a display device (for example, a television set) corresponding to display 140 by wired or wireless connections.

Input unit 150 is a unit for receiving operations input by a user. Input unit 150 may include, for example, a keyboard, a keypad, and a pointing device such as a mouse. Input unit 150 may be configured as a touch screen together with display 140.

Information-processing device 100 may double as a gaming machine. However, a gaming machine may be provided as an external device, separate from information-processing device 100. In such a case, information-processing device 100 can receive data via interface 130. Alternatively, if information-processing device 100 and a gaming machine can use one detachable storage medium, information-processing device 100 may read data stored in the detachable storage medium written by the gaming machine.

The foregoing is a description of a hardware configuration of information sharing system 10. By the configuration, users can post and read shared information using an information sharing service, and shared information is shared among users. A user can write a text about a character of a certain game, and submit the text as shared information. Alternatively, a user can submit an image as shared information, by drawing an illustration or capturing a screenshot while playing a game. A user can post shared information associated with a specific character or not associated with any character.

Figure 5:
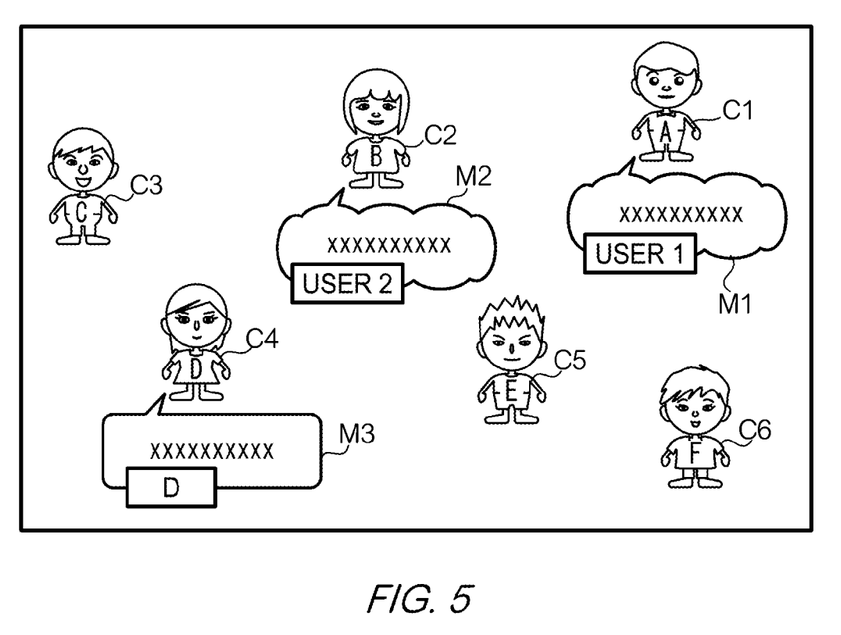
FIG. 5 shows an example of a non-limiting community space.

FIG. 5 is a diagram showing an example of a screen displaying a community space. In the present exemplary embodiment, the community space is a virtual space that displays one or more characters of a certain game. The community space is also a place for communicating with users who are players of the game. A user can confirm shared information posted by another user by browsing a message displayed with a character in the community space. That is, a message herein includes at least shared information.

As shown in FIG. 5, character objects (C1 to C6) and balloon objects (M1 to M3) are displayed in the community space. A character object is an object that represents a character with regard to the game. Each character object represents a different character. A character object can be a 3D object represented by polygons.

Each character object is displayed so that it moves autonomously in the virtual space. In the present exemplary embodiment, "autonomously" refers to behavior in accordance with a specific rule (algorithm). Therefore, each character object changes its position at random, and not in relation to other objects. However, a character object may not always move in such a manner. For example, a character object may move in accordance with an algorithm that changes the moving direction of the character object if it nearly collides with another object.

A balloon object is an object for displaying a message. Each balloon object is displayed adjacent to a character object so that the message is displayed as if the character object utters a word or thinks a thought, giving an impression that the character object and the message are associated. In this example, a balloon object is displayed below the corresponding character object. A balloon object is not required to be displayed below the corresponding character object, which may be displayed adjacent to the corresponding character object.

The message displayed in a balloon object includes two types of message: shared information and a default message. Shared information is posted by plural users and transmitted from server device 200 to information-processing device 100. On the other hand, a default message is a message predetermined for each character. A default message reflects, for example, personality or behavior of the corresponding character. Plural default messages may be assigned to one character. Plural default messages may be prepared in accordance with when they are to be displayed, such as for morning ("good morning," etc.), for noon ("hello," etc.), and for night ("good evening" etc.).

In information-processing device 100, balloon objects have different appearances, depending on a type of message, to distinguish one from another. In the example of FIG. 5, balloon objects M1 and M2 represent displaying shared information, and balloon object M3 represents displaying a default message. In this case, the shape of the frame of a balloon object for displaying shared information is different from that for displaying a default message. Information processing device 100 may distinguish shared information from a default message by use of another method, such as varying the colors of balloons or the font styles of messages. In this example, information-processing device 100 also distinguishes a message by a name displayed with a balloon object. Information-processing device 100 displays the user name of the poster when displaying shared information, and displays the name of the character when displaying a default message.

It is to be noted that only a part of the community space is shown in FIG. 5. There are more character objects in the remaining part of the virtual space, not shown in FIG. 5. The community space may be a 2D virtual space or a 3D virtual space. Moreover, there may be other objects displayed such as plants or buildings in the community space.

A user can change a display range of the virtual space. The display range can be changed by moving of a display position (coordinate) and by changing of a display magnification. Information-processing device 100 is able to display the whole virtual space or the part of the enlarged virtual space according to an input operation performed by a user. A number of character objects displayed at one time may change depending on a display magnification.

Information-processing device 100 is able to display a screen with regard to each character by an instruction to select the character object by a user. Hereinafter, the screen is referred to as "character screen."

Figure 6:
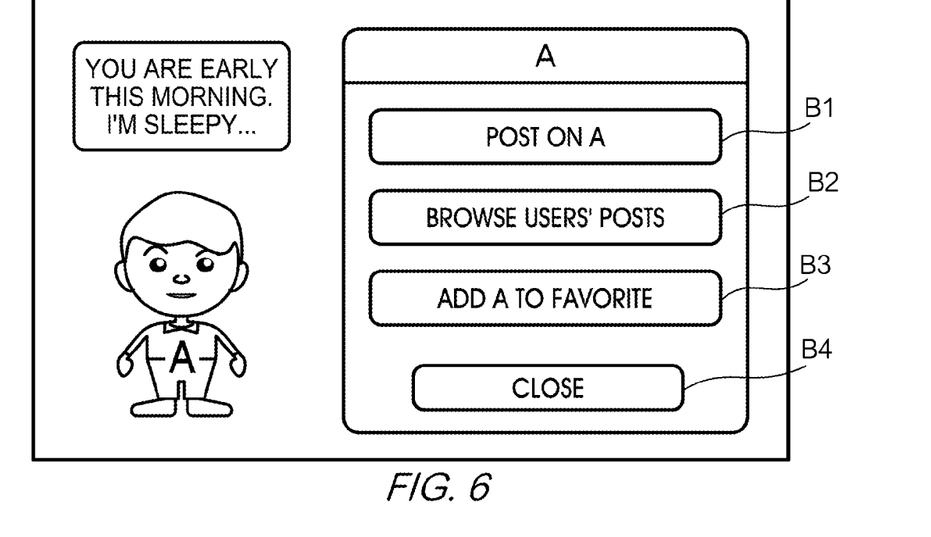
FIG. 6 shows an example of a non-limiting character screen.

FIG. 6 is a diagram showing an example of a character screen, which is the character screen of the character named "A." Shown on the character screen is an enlarged character object, a default message, post button B1, browse button B2, favorite button B3, and close button B4.

Post button B1 is a button (object) for posting shared information associated with the character. When post button B1 is selected, information-processing device 100 displays an input screen for inputting shared information (text or image), and transmits shared information input to server device 200. At this time, information-processing device 100 transmits shared information, which is information associated with the character displayed on the character screen by associated information.

Browse button B2 is a button for browsing shared information associated with the character. When browse button B2 is selected, information-processing device 100 receives shared information associated with the character (that is, information associated with the character by associated information) from server device 200, and displays a list of shared information. In this case, unlike in the case of the community space as shown in FIG. 5, only shared information associated with a specific character is displayed.

Favorite button B3 is a button for registering the character as a "favorite." When favorite button B3 is selected, information-processing device 100 adds the character to favorite characters. Favorite characters can be treated differently from other characters when displayed in community space. The number of favorite characters is not necessarily limited.

Close button B4 is a button for closing the character screen. When close button B4 is selected, information-processing device 100 hides the character screen to revert to displaying the community space.

It is to be noted that information-processing device 100 can accept posting or browsing of shared information by a screen other than the character screen. In this case, information-processing device 100 may post shared information not associated with a specific character. Moreover, information-processing device 100 is able to display not only a list of shared information associated with a specific character but also various types of shared information in order of posted time and date. Such a display style is an example of a display style not dependent on association indicative of associated information. While various types of shared information are displayed, information-processing device 100 may accept an instruction input by a user to select associated information, and extract shared information associated with a specific character from shared information displayed.

Figure 7:
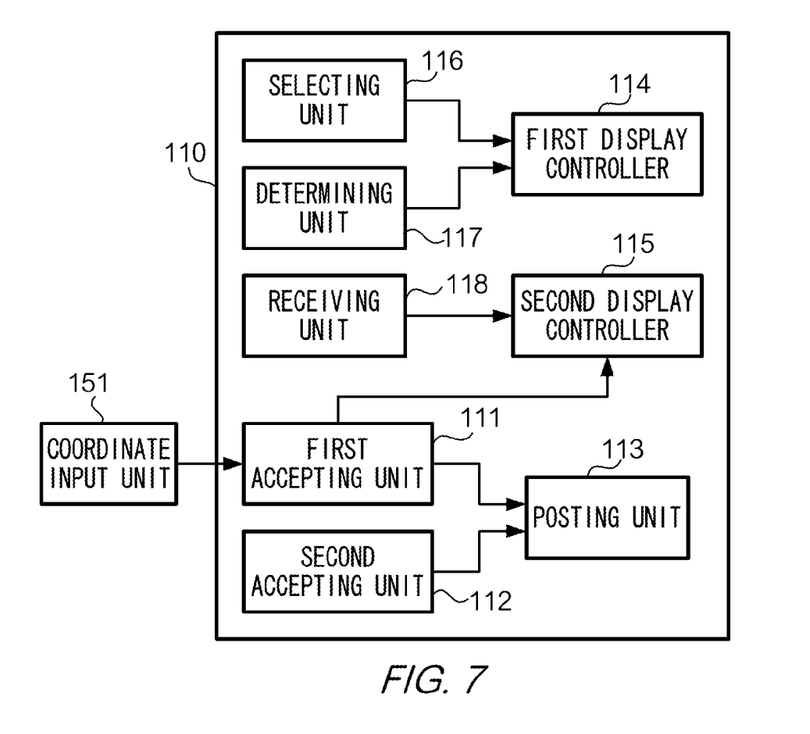
FIG. 7 is a block diagram showing an example of a non-limiting functional configuration of the information-processing device.

FIG. 7 is a block diagram showing a functional configuration of information-processing device 100 to realize the display described above. When the application program is executed by control unit 110 of information-processing device 100, functions of first accepting unit 111, second accepting unit 112, posting unit 113, first display controller 114, second display controller 115, selecting unit 116, determining unit 117, and receiving unit 118 are provided. Coordinate input unit 151 is a part of input unit 150 for inputting a coordinate in the virtual space, such as a pointing device or a touch screen.

First accepting unit 111 accepts an instruction to select a character object. First accepting unit 111, in other words, accepts an instruction to select a character to be associated with shared information. First accepting unit 111 can accept, for example, an instruction based on a coordinate input by coordinate input unit 151. Specifically, First accepting unit 111 identifies a character object, which is displayed in a position indicative of a coordinate input by coordinate input unit 151, then accepts the instruction to select the character object.

Second accepting unit 112 accepts shared information. Second accepting unit 112 can accept shared information not only as text but also as an image. Second accepting unit 112 can accept shared information by a predetermined input screen.

Posting unit 113 posts shared information to the information sharing service. Specifically, posting unit 113 transmits shared information accepted by second accepting unit 112 to server device 200. Posting unit 113 may add data to shared information when needed. When first accepting unit 111 accepts an instruction to select a character object, posting unit 113 transmits shared information associated with the selected character object.

First display controller 114 controls display of one or more character objects displayed in the virtual space. First display controller 114 displays a character object(s) in the virtual space, based on a prescribed rule. On the other hand, second display controller 115 controls display of shared information. Second display controller 115 may display shared information in the virtual space or on a screen other than the virtual space.

Selecting unit 116 selects a character object to be displayed by first display controller 114. Selecting unit 116 selects, when a portion of plural character objects is to be displayed, character objects to be displayed based on a certain condition. Selecting unit 116, for example, when the day is a birthday or close to a birthday of a character, selects the character object of the character to be displayed, based on the attribute set for each character. Selecting unit 116 may select a specific character object on a specific date and time based on a condition with respect to timing.

Determining unit 117 determines a display magnification of the virtual space displayed by first display controller 114. Determining unit 117 determines, for example, the display magnification according to an input operation performed by a user. First display controller 114 displays the virtual space at a magnification determined by determining unit 117. As a result, a display size of a character object is enlarged or contracted in accordance with the display magnification of the virtual space. First display controller 114 may change the number of the character objects displayed on a screen according to the display magnification.

Receiving unit 118 receives shared information posted to the information sharing service. For example, receiving unit 118 can receive shared information from server device 200 when activating the application program or at specified time intervals. Receiving unit 118 receives relatively new shared information (that is, shared information posted lately) such as shared information posted during a recent predetermined period or a predetermined number of shared information items posted recently. Receiving unit 118 receives shared information both associated with a character and not associated with a character, regardless of presence or absence of associated information or a content of associated information.

Figure 8:
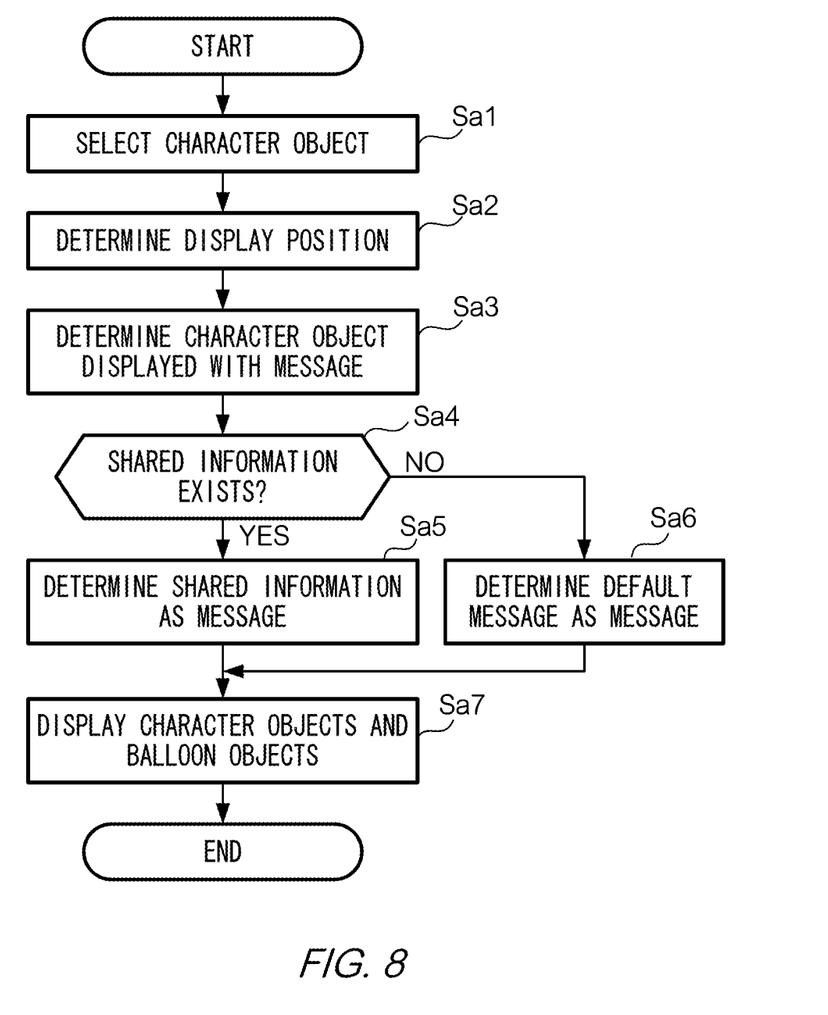
FIG. 8 is a flowchart showing an example of a non-limiting process executed by the information-processing device.

FIG. 8 is a flowchart showing an example of a process executed by information-processing device 100. Firstly, control unit 110 selects character objects to be displayed (step Sa1). Control unit 110 can select character objects based on a date and a time of executing the process. Control unit 110 can also preferentially select a character object whose character is a favorite character, and always select a specific character object.

After that, control unit 110 determines each display position of the character object to be displayed (step Sa2). The method of determination is not limited. Control unit 110 determines display positions of character objects based on a prescribed rule. For example, control unit 110 determines display positions of character objects so that they can be allocated evenly in the virtual space. Moreover, control unit 110 may allocate a certain pair of character objects separately or closely. For example, control unit 110 may separate a pair of character objects that are associated with more shared information than others. Control unit 110 may determine the display position at random. When control unit 110 repeats the process as described below, control unit 110 determines the display position so that each character moves slightly from a previous display position in a subsequent process. Specifically, control unit 110 moves each character according to a length of its strides.

Next, control unit 110 determines character objects that are displayed with messages (step Sa3). In the present exemplary embodiment, control unit 110 displays a message only with a part of character objects to be displayed in a screen. Control unit 110 determines that character objects fulfill a prescribed condition, such as "Messages are not displayed overlapping," or "A character object associated with shared information takes priority over others." A number of messages displayed is not particularly limited. However, it is preferable that the number be set to an upper limit to avoid complicated display. The upper limit may vary according to a display magnification of the virtual space.

Control unit 110 determines whether there is shared information associated with each character object determined in step Sa3 (step Sa4). Control unit 110 determines whether a character object determined in step Sa3 is associated with shared information, which is recently received from server device 200 and stored in information-processing device 100, by associated information.

Control unit 110 makes a determination to display shared information as a message, relative to a character object associated with shared information (step Sa5), and to display a default message as a message, relative to a character object not associated with shared information (step Sa6). Namely, control unit 110 displays shared information with priority over a default message. Then, control unit 110 displays each character object at a position determined in step Sa2, and displays messages determined in steps Sa5 and Sa6 as balloon objects (step Sa7).

In step Sa5, when there is a plurality of corresponding shared information items, control unit 110 may determine what shared information is displayed based on reaction information. For example, control unit 110 may display shared information containing more "sympathy" or "comments." In addition, control unit 110 can determine which character objects are displayed based on reaction information.

After displaying character objects and balloon objects in this manner, information-processing device 100 executes the processing from step Sa2 to Sa1 repeatedly at specified time intervals. As a result, a character object displayed with a balloon object continuously changes at specified time intervals. At that time, each character object moves autonomously and changes its display position gradually, giving an appearance of walking around in the virtual space. Consequently, a user can read various messages associated with each character by browsing the community space.

Figure 9:
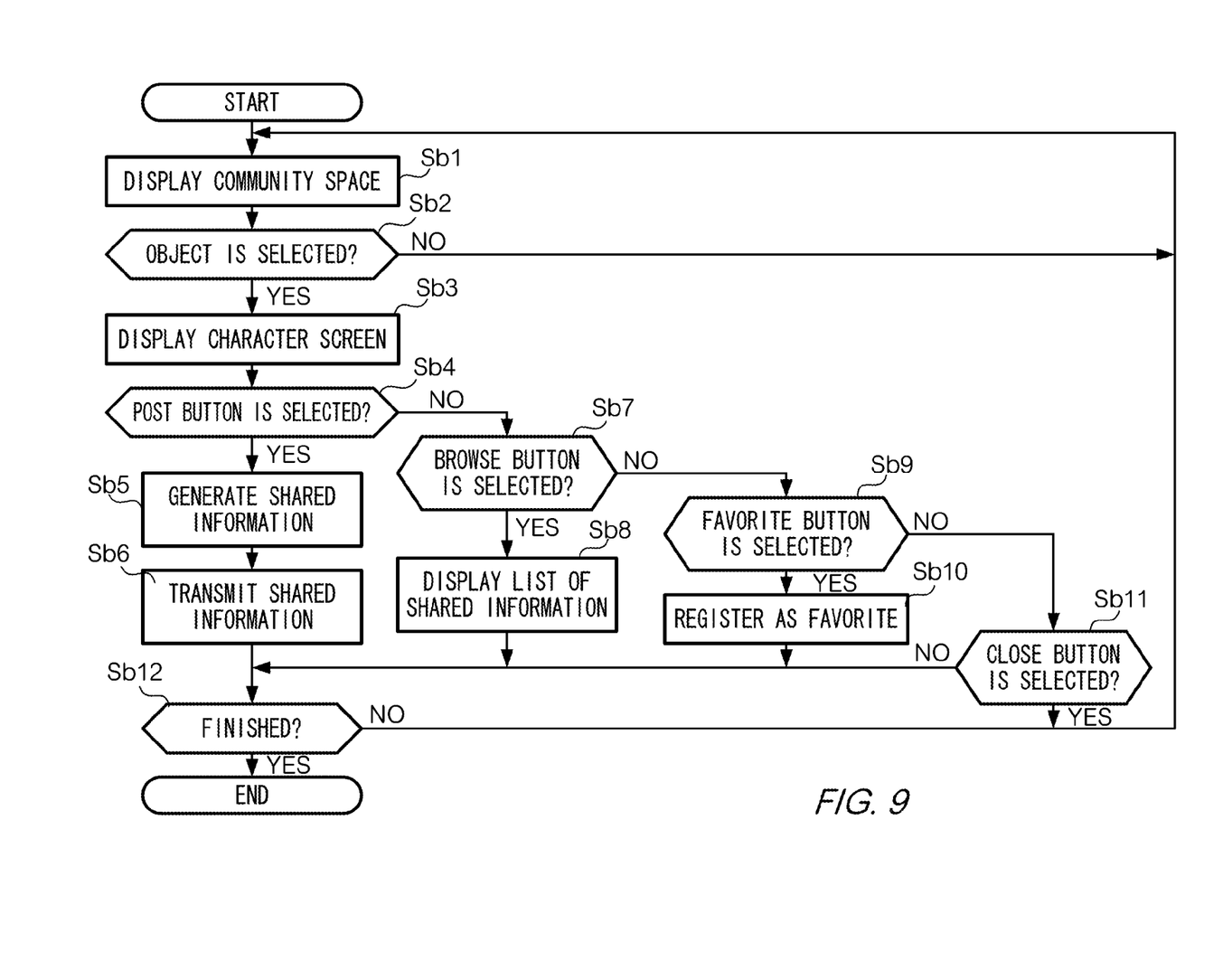
FIG. 9 is a flowchart showing an example of a non-limiting process executed by the information-processing device.

FIG. 9 is a flowchart showing an example of a process executed by information-processing device 100 after displaying the community space. By this process, control unit 110 displays the community space as shown in FIG. 8 (step Sb1). Next, control unit 110 determines whether a character object is selected by a user (step Sb2). Control unit 110 repeats step Sb1 and Sb2 until a character object is selected.

When a character object is selected, control unit 110 displays a character screen corresponding to the selected character object (step Sb3). Namely, control unit 110 switches display from the community space to the character screen. Then, control unit 110 waits for a subsequent operation. A subsequent operation herein is an operation to select post button (B1), browse button (B2), favorite button (B3), or close button (B4), according to FIG. 6.

Control unit 110 determines whether post button (B1) is selected (step Sb4). When post button (B1) is selected, control unit 110 generates shared information according to an input operation performed by the user (step Sb5), and transmits the shared information to server device 200 (step Sb6). In steps Sb5 and Sb6, control unit 110 generates and transmits shared information associated with the character object selected in step Sb2. On the other hand, if a subsequent operation is not an operation in which post button (B1) is selected, control unit 110 determines whether browse button (B2) is selected (step Sb7). When browse button (B2) is selected, control unit 110 displays a list of shared information associated with the character object selected (step Sb8).

If, in a subsequent operation, neither post button (B1) nor browse button (B2) is selected, control unit 110 determines whether favorite button (B3) is selected (step Sb9). When favorite button (B3) is selected, control unit 110 registers a character corresponding to the selected character object as "favorite" (step Sb10). Control unit 110 stores the favorite character in storage unit 120.

If, in a subsequent operation, favorite button (B3) is not selected either, control unit 110 determines whether close button (B4) is selected (step Sb11). When close button (B4) is selected, control unit 110 hides the character screen and displays the community space again (step Sb1).

When step Sb6, Sb8, or Sb10 is executed, or in step Sb11 becomes "NO" is determined, that is, no button is selected, control unit 110 determines whether the process is finished (step Sb12). Control unit 110 finishes the process when the user performs an input operation indicative of finishing display of the community space, or no input operation is performed for a prescribed time. On the other hand, when the process is continued, control unit 110 displays the community space (step Sb1), and executes subsequent steps.

As described in the foregoing, according to the present exemplary embodiment, a user can select a specific character in the community space, and post shared information associated with the selected character easily. This enables plural users to post shared information associated with one specific character.

2. Modifications

The above exemplary embodiment is an example of an embodiment of the present technique. The present technique may be implemented in embodiments shown by the following modifications, other than the above exemplary embodiment. The following modifications may be combined with each other.

Modification 1

The character screen described above does not necessarily have to be displayed. Information-processing device 100 may display, when a character object is selected in the community space, shared information, or an input screen of shared information associated with the character object, without displaying the character screen.

Modification 2

According to the present technique, an attribute of a character (object) is not limited to its birthday. For example, if a character has a class such as gender, the class may be used as its attribute. In this case, information-processing device 100 may select character objects having the same attribute to be displayed. Alternatively, information-processing device 100 may select character objects so that the character having each attribute is distributed at a prescribed rate.

Modification 3

In the community space described above, information-processing device 100 displays only shared information associated with a character. However, there is shared information not associated with any character. Therefore, information-processing device 100 may display such shared information (that is, shared information not associated with any character) in accordance with a different rule from that for shared information associated with any character. For example, information-processing device 100 may display shared information not associated with a character at a specific position in the virtual space. Alternatively, information-processing device 100 may display a special character object that is associated with shared information not having association by associated information, and display such shared information adjacent to the character object.

Modification 4

An information-processing device according to the present technique may be comprised of two displays; one that displays a virtual space and another that displays a character screen. By this configuration, there is no screen transition from the community space to the character screen, and a user can browse both screens. In this case, two displays may be integrated in one housing or installed in different housings.

Modification 5

The present technique can be used for displaying characters of a game and the like, accepting an instruction to select a character displayed, and posting shared information associated with the selected character.

Namely, the present technique may also provide an information-processing device, including: a first display controller that displays a plurality of characters as objects to be selected; a first accepting unit that accepts an instruction to select the character displayed by the first display controller; a second accepting unit that accepts shared information; and a posting unit that posts the shared information accepted by the second accepting unit, associated with the character selected by the first accepting unit on accepting the instruction, to an information sharing service for sharing information among a plurality of users. In this case, characters displayed as options are not necessarily displayed in a virtual space, and may be displayed in a pull-down menu.

Modification 6

The present technique can be applied to an application program other than a game. An object of the present technique is not necessarily a character object. For example, an object of the present technique is an object of a building such as a landmark on a map. A map herein may be a map of virtual space or a map of an actual space.

Modification 7

The present technique does not necessarily employ a single information-processing device. An information-processing device of the present technique may be realized by cooperation of plural devices. For example, a part of the configuration of information-processing device 100 may be realized by server device 200. In addition, as described in Modification 4, the present technique may be realized by use of two displays.

Modification 8

The present technique can provide not only an information-processing device, but also an information-processing system, information-processing method, and others. Moreover, the present technique can provide a program to realize the function of information-processing device 100. The program may be provided to an information-processing device in the form of a storage medium such as an optical disk or a semiconductor memory. Alternatively, the program may be downloaded to an information-processing device via a network such as the Internet.

What is claimed is:

1. An information-processing system, comprising a processor system including at least one processor, the processor system being configured to:
   display one or more character objects in a virtual space;
   accept an instruction to select the displayed one or more character objects;
   accept shared information; and
   post the accepted shared information, regarding the selected character object, to an information sharing service for sharing information among a plurality of users,
   wherein the selected object does not represent a character associated with a specific user.

2. The information-processing system according to claim 1, wherein the processor system is further configured to:
   display a plurality of different character objects; and
   accept the instruction to select a character object from the plurality of character objects.

3. The information-processing system according to claim 1, wherein the one or more objects are moved autonomously in the virtual space.

4. The information-processing system according to claim 1, wherein the processor system is further configured to select the one or more character objects that are to be displayed, based on a predetermined condition.

5. The information-processing system according to claim 4, wherein the one or more character objects are selected based on a timing condition.

6. The information-processing system according to claim 4, wherein the one or more character objects are selected based on an attribute of each object.

7. The information-processing system according to claim 1, wherein the processor system is further configured to:
   receive shared information posted to the information sharing service by other information-processing devices associated with the one or more character objects displayed in the virtual space; and
   display the received shared information.

8. The information-processing system according to claim 7, wherein, while the character object associated with the received shared information is displayed, the shared information is displayed near the character object.

9. The information-processing system according to claim 7, wherein, when the instruction to select the character object associated with the received shared information is accepted, the shared information is displayed.

10. The information-processing system according to claim 7, wherein the processor system is further configured to display the received shared information or a predetermined message with respect to the displayed character objects.

11. The information-processing system according to claim 10, wherein the shared information is displayed with priority over the message.

12. The information-processing system according to claim 10, wherein the shared information or the message is displayed in a way that allows them to be distinguished from one another.

13. The information-processing system according to claim 7, wherein:
   the shared information includes first shared information associated with the one or more character objects and second shared information not associated with the one or more objects; and
   the processor system is further configured to receive the first shared information or the second shared information.

14. The information-processing system according to claim 13, wherein the second shared information is displayed in accordance with a different rule from that for the first shared information.

15. The information-processing system according to claim 7, wherein the shared information is displayed in a first mode in which the shared information is displayed with the one or more objects in accordance with its association to the one or more objects, or a second mode in which the shared information is displayed without the association.

16. The information-processing system according to claim 7, wherein:
   the shared information includes associated information that indicates the association to the one or more objects; and
   the shared information is displayed based on the associated information.

17. The information-processing system according to claim 1, wherein the processor system is further configured to determine a display magnification of the displayed virtual space.

18. The information-processing system according to claim 1, wherein the processor system is further configured to:
   input a coordinate in the virtual space; and
   accept the instruction to select one of the one or more objects based on the input coordinate.

19. An information-processing device, comprising:
   a display; and
   a processor system including at least one processor, the processor system being configured to at least:
   display one or more character objects in a virtual space;
   accept an instruction to select one of the displayed one or more character objects;
   accept shared information; and
   post the accepted shared information, regarding the selected character object, to an information sharing service for sharing information among a plurality of users,
   wherein the selected character object does not represent a character associated with a specific user.

20. A non-transitory storage medium storing a program for causing a computer to execute the steps of:
   displaying one or more character objects in a virtual space;
   accepting an instruction to select one of the one or more displayed character objects;
   accepting shared information; and
   posting the accepted shared information, regarding the selected character object, to an information sharing service for sharing information among a plurality of users,
   wherein the selected character object does not represent a character associated with a specific user.

21. An information-processing method, comprising:
   displaying one or more character objects in a virtual space;
   accepting an instruction to select one of the one or more displayed objects;
   accepting shared information; and
   posting the accepted shared information, regarding the selected character object, to an information sharing service for sharing information among a plurality of users, wherein the selected character object does not represent a character associated with a specific user.

22. The information-processing system according to claim 1, wherein the shared information is accepted from a user after the selection of the character object.

23. The information-processing device according to claim 19, wherein the shared information is accepted from a user after the selection of the character object.

24. The non-transitory storage medium according to claim 20, wherein the shared information is accepted from a user after the selection of the character object.

25. The information-processing method according to claim 21, wherein the shared information is accepted from a user after the selection of the character object.

26. An information-processing system, comprising a processor system including at least one processor, the processor system being configured to:
    display one or more objects in a virtual space;
    accept an instruction to select the displayed one of the one or more objects;
    accept shared information; and
    post the accepted shared information, associated with the selected object, to an information sharing service for sharing information among a plurality of users, wherein
    the selected object does not represent a character associated with a specific user, and the one or more objects are moved autonomously in the virtual space.

27. An information-processing system, comprising a processor system including at least one processor, the processor system being configured to:
    display one or more objects in a virtual space;
    accept an instruction to select the displayed one of the one or more objects;
    accept shared information;
    post the accepted shared information, associated with the selected object, to an information sharing service for sharing information among a plurality of users, and
    select the one or more objects that are to be displayed, based on a predetermined condition, wherein
    the selected object does not represent a character associated with a specific user; and the one or more objects are selected based on a timing condition.

28. An information-processing system, comprising a processor system including at least one processor, the processor system being configured to:
    display one or more objects in a virtual space;
    accept an instruction to select the displayed one or more objects;
    accept shared information;
    post the accepted shared information, associated with the selected object, to an information sharing service for sharing information among a plurality of users,
    receive shared information posted to the information sharing service by other information-processing devices associated with the one or more objects displayed in the virtual space; and
    display the received shared information,
    wherein the shared information includes associated information that indicates the association to the one or more objects; and the shared information is displayed based on the associated information.

29. An information-processing method, comprising:
    displaying one or more objects in a virtual space;
    accepting an instruction to select the displayed one of the one or more objects;
    accepting shared information; and
    posting the accepted shared information, associated with the selected object, to an information sharing service for sharing information among a plurality of users, wherein
    the selected object does not represent a character associated with a specific user, and the one or more objects are moved autonomously in the virtual space.

30. An information-processing method, comprising:
    displaying one or more objects in a virtual space;
    accepting an instruction to select the displayed one of the one or more objects;
    accepting shared information;
    posting the accepted shared information, associated with the selected object, to an information sharing service for sharing information among a plurality of users, and
    selecting the one or more objects that are to be displayed, based on a predetermined condition, wherein
    the selected object does not represent a character associated with a specific user; and the one or more objects are selected based on a timing condition.

31. An information-processing method, comprising:
    displaying one or more objects in a virtual space;
    accepting an instruction to select the displayed one or more objects;
    accepting shared information;
    posting the accepted shared information, associated with the selected object, to an information sharing service for sharing information among a plurality of users,
    receiving shared information posted to the information sharing service by other information-processing devices associated with the one or more objects displayed in the virtual space; and
    displaying the received shared information,
    wherein the shared information includes associated information that indicates the association to the one or more objects; and the shared information is displayed based on the associated information.

* * * * *